(12) United States Patent
Miyamura et al.

(10) Patent No.: US 11,789,795 B2
(45) Date of Patent: Oct. 17, 2023

(54) USING A CUT AND PASTE SEGMENT FOR READING A STANDARD HOUSEKEEPING DATA SET

(71) Applicant: International Business Machines Corporation, Armonk, NY (US)

(72) Inventors: Tsuyoshi Miyamura, Yokohama (JP); Setsuko Masuda, Toshima-ku (JP); Mitsuhiro Nishida, Sagamihara (JP); Tatsuki Sawada, Matsudo (JP)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/453,878

(22) Filed: Nov. 8, 2021

(65) Prior Publication Data
US 2023/0161654 A1     May 25, 2023

(51) Int. Cl.
*G06F 11/07* (2006.01)
*G06F 3/06* (2006.01)
*G11B 20/18* (2006.01)

(52) U.S. Cl.
CPC ........ *G06F 11/0727* (2013.01); *G06F 3/0619* (2013.01); *G06F 3/0659* (2013.01); *G06F 3/0682* (2013.01); *G06F 11/0793* (2013.01); *G11B 20/1816* (2013.01)

(58) Field of Classification Search
CPC .. G06F 11/0727; G06F 3/0619; G06F 3/0659; G06F 3/0682; G06F 11/0793; G06F 3/064; G11B 20/1816
See application file for complete search history.

(56) References Cited

U.S. PATENT DOCUMENTS

| | | | |
|---|---|---|---|
| 9,471,255 B2 * | 10/2016 | Hirata | G11B 20/1202 |
| 10,078,466 B2 * | 9/2018 | Hasegawa | G11B 27/00 |
| 10,110,257 B2 | 10/2018 | Katagiri | |
| 10,621,065 B2 * | 4/2020 | Nylander-Hill | G06F 11/3409 |
| 11,056,140 B1 | 7/2021 | Miyamura | |
| 11,437,070 B1 * | 9/2022 | Miyamura | G06F 3/061 |
| 2015/0193304 A1 | 7/2015 | Katagiri | |
| 2020/0357429 A1 | 11/2020 | Miyamura | |

OTHER PUBLICATIONS

Disclosed Anonymously, et al., "A Method for High Speed Recovery of High Resolution Tape Directory on Linea Tape", ip.com Prior Art Database Technical Disclosure, IP.com No. IPCOM000018645D, Jul. 30, 2003, 3 pgs.

* cited by examiner

*Primary Examiner* — Andrew Sasinowski
(74) *Attorney, Agent, or Firm* — Alexander G. Jochym; Jared L. Montanaro

(57) ABSTRACT

In an approach to using a cut and paste segment for reading an sHKDS, a request to reposition a tape media in a tape drive is received. Responsive to encountering an error reading an sHKDS while attempting to reposition the tape media, one segment of a plurality of segments from a data set cut and paste error recovery procedure (ERP) is used for an sHKDS cut and paste ERP. Responsive to recovering the sHKDS using the sHKDS cut and paste ERP, the one segment reserved for the sHKDS cut and paste ERP is released to the data set cut and paste ERP.

20 Claims, 6 Drawing Sheets

USING A CUT AND PASTE SEGMENT FOR READING A STANDARD HOUSEKEEPING DATA SET

BACKGROUND

The present invention relates generally to the field of tape-based data storage, and more particularly to using a cut and paste segment for reading a standard Housekeeping Data Set (sHKDS).

Magnetic tape data storage is a system for storing digital information on magnetic tape using digital recording. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction. The first commercial digital-tape storage system stored roughly a megabyte of data on one reel of tape, but modern cartridges hold 20 terabytes or more, and the capacity is constantly increasing.

The reason magnetic tape drives are still in use today, especially as an offline data backup, is because of long archival stability and very favorable unit costs. Although data stored on tape cannot be accessed as quickly as data stored on hard drives, the storage is more energy efficient and reliable. Magnetic tape storage also more cost effective, typically as little as one-sixth the cost to store the same amount of data on a disk. And while the rate for increasing capacity for disc drives is decreasing, the capacity for storage on magnetic tape still increases approximately 33 percent each year.

SUMMARY

Embodiments of the present invention disclose a method, a computer program product, and a system for using a cut and paste segment for reading an sHKDS. In one embodiment, a request to reposition a tape media in a tape drive is received. Responsive to encountering an error reading an sHKDS while attempting to reposition the tape media, one segment of a plurality of segments from a data set cut and paste error recovery procedure (ERP) is used for an sHKDS cut and paste ERP. Responsive to recovering the sHKDS using the sHKDS cut and paste ERP, the one segment reserved for the sHKDS cut and paste ERP is released to the data set cut and paste ERP.

DETAILED DESCRIPTION

Magnetic tape data storage is a system for storing digital information on magnetic tape using digital recording. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction.

When writing data on a tape or reading data from a tape, the tape must be moved to the position where the data is to be written or read in advance of the write or read operation. The process of moving the tape to the target data position is called repositioning. The reposition request is made with a record number or file mark number, which indicates a delimiter of a file composed of an arbitrary number of records. The tape drive does not know where the record or file mark is written on the tape, and therefore a mechanism called a Tape Directory (TD) is used to store location information for the target record. In one embodiment, in addition to the TD mechanism, a High-Resolution Tape Directory (HRTD) is also used.

Figure 2:
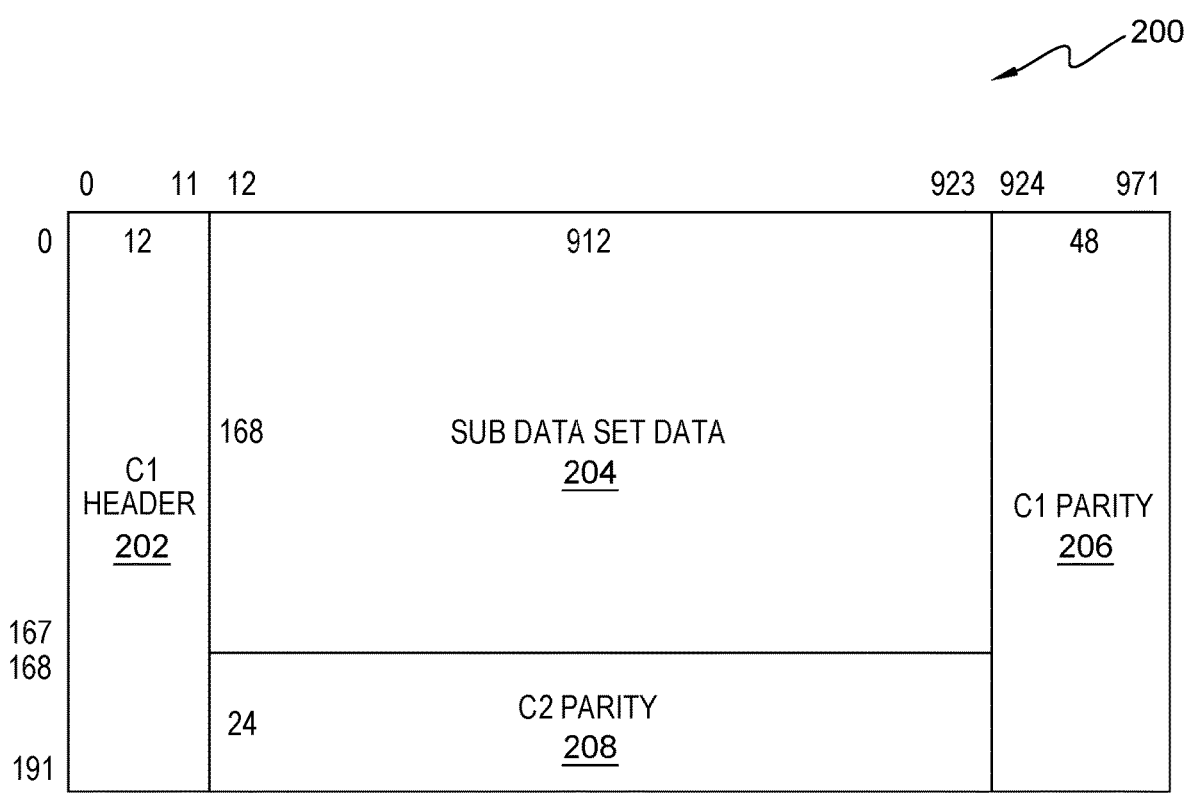
FIG. 2 is an example of the structure of a sub data set on a typical tape drive, in accordance with an embodiment of the present invention.

Data is written from the host to the tape drive in units of records. Records written from the host are encrypted and compressed before being written onto the tape drive buffer. In an example of a typical tape drive, when 168 rows of 912 bytes of data are written in the buffer, a 48-byte error correction code (C1) is added to every 912 byte row. When C1 for 168 rows is added, a 24-byte error correction code (C2) is added to the 168 bytes in the vertical direction. Finally, a 12-byte header is added to each row. This collection of 972×192 bytes is called a sub data set. When 64 sub data sets are collected, it becomes a unit called a data set. It is stored in order on the buffer on the tape drive. The tape drive writes data on the tape media in units of this data set. An example of this tape configuration is illustrated in FIG. 2 below.

Figure 3:
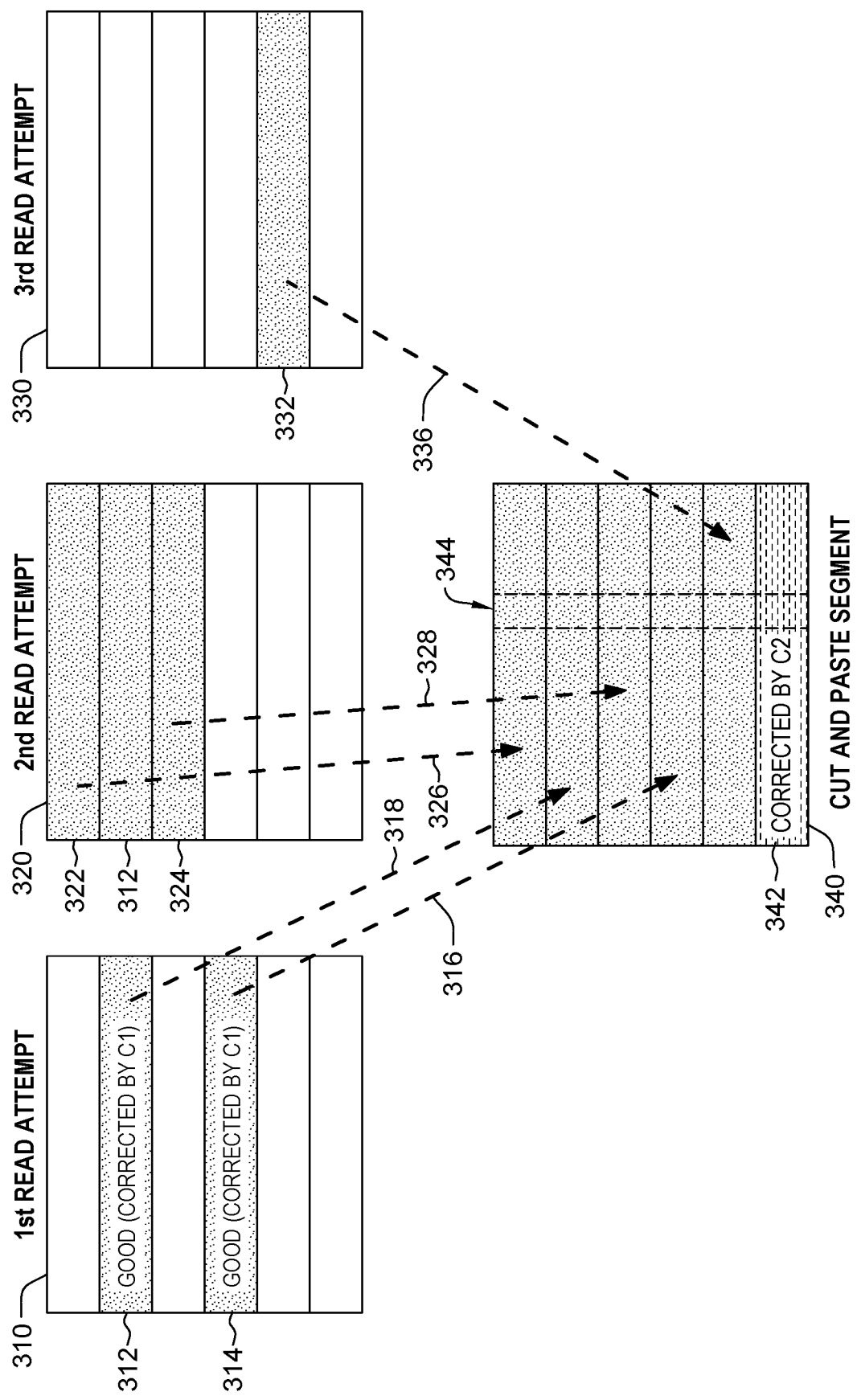
FIG. 3 is a simplified example of a cut and paste ERP, in accordance with an embodiment of the present invention.

When reading the data written on the tape, the reading may fail depending on the condition of the head and the degree of deterioration of the tape media. In that case, the tape is rewound and reread repeatedly until the data can be read correctly. This process is called an ERP. In operation the entire data set typically cannot be read by simply repeating the read operation, so ERP is repeated while changing various settings of the tape drive. By performing multiple read ERPs while changing various tape drive settings, the drive can read different C1 rows each ERP. Therefore, in addition to the area on the tape that was used for the read process, another area is reserved for storing the C1 rows that could be corrected by C1 at the time of each reading are copied to the area. The ERP repeats until the number of C1 rows that can correct the error bytes by C2. This mechanism called cut and paste ERP. An example of cut and paste ERP is illustrated in FIG. 3 below.

In an example of a typical tape drive, instead of using a single segment as in cut and paste ERP, the area (segment) for reading 16 data sets is reserved as the segment for cut & paste ERP, i.e., the drive reads 16 consecutive data sets at one read attempt. As a result, if there is a data set in poor condition in the middle of the tape and the poor condition data set can be read by repeating ERPs multiple times, cut & paste ERP is performed repeatedly in parallel for the following 15 segments.

In an example of a typical tape drive for high-end systems, housekeeping information is written into an sHKDS in a non-user data area to enable access data on the tape appropriately. One piece of housekeeping information written in the sHKDS is a High Resolution Tape Directory (HRTD). The user data on a tape is divided in multiple wraps. In one common tape example, the tape has 240 wraps per tape width direction. In this tape, the HRTD divides the tape into 128 regions in the tape length direction. Since the tape length is approximately 1000 meters (m), each region is approximately 7.8 m. This tape contains 240 wraps×128 regions of HRTD. Each of them records the last written data set number, write pass, and location of the data set, the total record number and total file marks number from the beginning of the tape, and the record number and the file marks number of the last data set.

When tape drive receives a request to locate a certain record, it refers to the information in the HRTD to determine which region the record belongs to. The drive navigates to the last data set of the previous region using the HRTD information, then reads forward the following data sets until it finds the target record using the data set number and write pass.

In normal operation the drive attempts to read the sHKDS when the tape is loaded, but a minimum number of ERPs are performed if the drive encounters an error while attempting to read the sHKDS. This is because sHKDS is not user data, and the drive wants to respond to the commands from host immediately by shorten the loading. If the sHKDS cannot be read, the drive cannot use the HRTD to locate the target record position. When a reposition command to locate a target record is issued, the drive navigates to the target record after recovering the HRTD. There are three methods to recover the HRTD.

In the first method, the HRTD is recorded in the end of data (EOD) which was written at the end of the user data set of each partition. This step navigates to the EOD to read the HRTD. For the example tape above, the tape length is approximately 1000 m and the high-speed velocity of the tape is 12 m/second, so it takes an average of one minute to read the HRTD. But since the HRTD information stored in the EOD is only for the partition, the drive is required to read another EOD when the drive repositions to the target record on a different partition. For example, if the drive recovers the HRTD of four partitions, it takes approximately four minutes to recover the HRTD.

In the second method, each user data set contains the HRTD of two regions in a Data Set Information Table (DSIT) which is reserved for housekeeping information. The drive reads the necessary number of data sets until whole HRTD is recovered. Since there are 128 areas in one wrap for the example tape drive, it is necessary to read the DSIT of 272×128/2=17,408 datasets to recover the HRTD of the 272 wraps. If the data sets are written ideally without any rewriting, about 7,500 datasets can be written in one wrap. To read 17,408 data sets, it is necessary to read data sets along 2 wraps and 350 m of the tape. Considering the time to navigating to the first start data set to read, it takes approximately 510 seconds, or 8 minutes and 30 seconds. For tapes that are in poor condition it will take even longer.

In the third method, the drive reads whole data set on the tape from the beginning of the tape to the EOD. For the example drive discussed above, this recover method takes approximately 14 hours to read the tape.

The present invention is a method to recover the sHKDS using cut and paste ERP. If sHKDS cannot be read during loading, one segment for cut and paste multi ERP used at the time of the reading ERP will be used as a segment dedicated to cut and paste for sHKDS until the sHKDS can be read. Once the sHKDS can be read, or the HRTD of all partitions can be recovered by another method, the segment is released from the sHKDS ERP, and that segment again can be used for cut and paste ERP for normal user data sets.

The sHKDS read immediately after loading a tape is one data set, therefore cut and paste ERP is performed by using the first segment out of the 16 segments reserved for cut and paste for normal data set reads. When reading a user data, if the user data set cannot be read, ERP is performed many times, e.g., 80 times for a typical tape drive. This is extremely time consuming. However, ERP is performed only for a minimum number of times, e.g., two to three times, in reading the sHKDS to reduce the loading time. In the present invention, if the tape loading process is completed without successfully reading the sHKDS, the first segment for of cut and paste ERP, which was used in reading the sHKDS, is reserved to be used as the segment for reading sHKDS. The remaining 15 segments are used for cut and paste ERP in normal user data set reading.

Currently, of the three HRTD recovery methods for use when it is not possible to read the sHKDS, the HRTD is usually recovered from the EOD using the first method. However, when the tape is divided into partitions, it is only possible to recover the HRTD in a partition that has an EOD written. In addition, it takes time to move to the position where the EOD is recorded in order to read EOD. In this case, if it is possible to recover the HRTD from a position near the BOT, the present invention makes it unnecessary to access the EOD of an unread partition.

In addition, a tape may not have an EOD written for various reasons. For example, in case of power cut to the tape drive during writing of data set due to a blackout or any other reason, an EOD may be marked invalid. In another example, failing to complete writing of a data set due to a problem on the tape drive or tape surface may lead to an invalid EOD. When an invalid EOD is indicated, no EOD can be read from the tape. In this case, the HRTD is recovered from the DSIT of the data set using the second method, which is extremely time consuming. Recovery of the HRTD by the present invention significantly reduces the recovery time.

Figure 1:
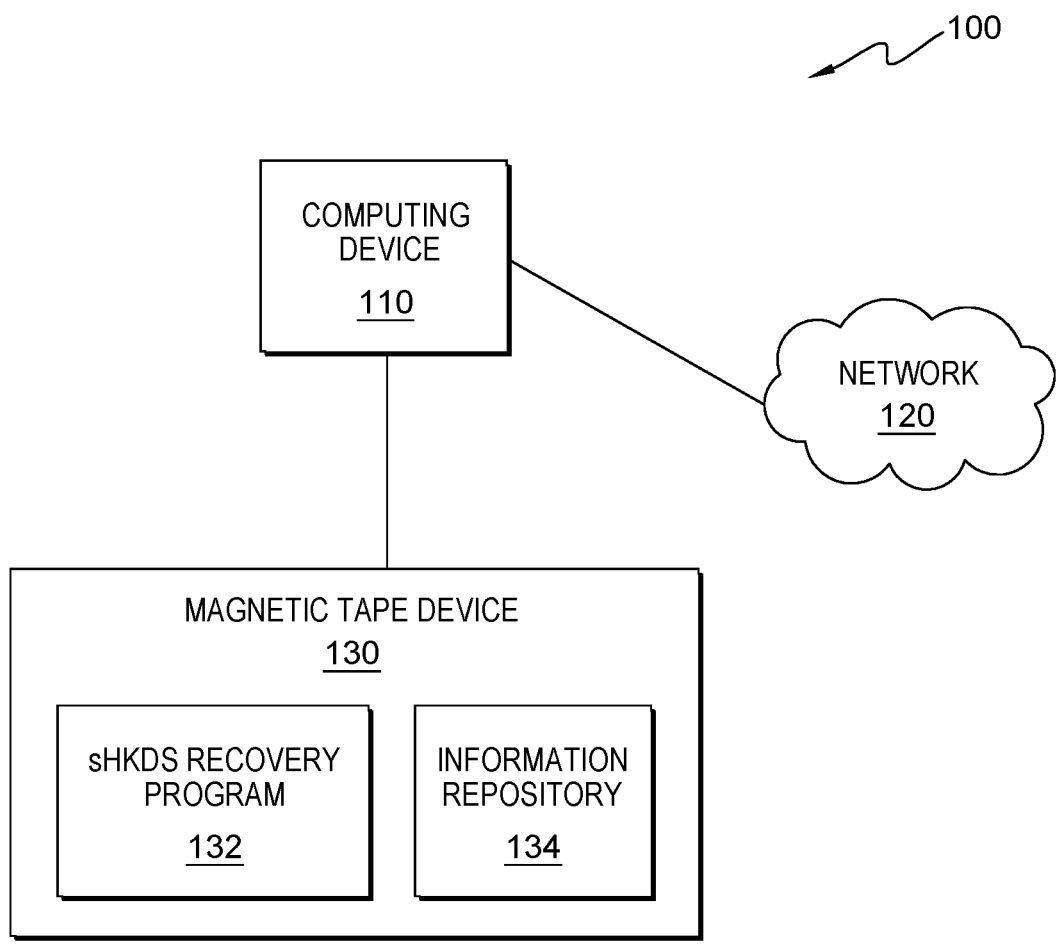
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of sHKDS recovery program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120 and magnetic tape device 130 connected to computing device 110. In another embodiment, magnetic tape device 130 may be connected to computing device 110 via network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100. In an embodiment, distributed data processing environment 100 may include any number of computing devices.

In an embodiment, magnetic tape device 130 includes sHKDS recovery program 132. In an embodiment, sHKDS recovery program 132 is a program, application, or subprogram of a larger program for using a cut and paste segment for reading an sHKDS. In an embodiment, distributed data processing environment 100 may include any number of magnetic tape devices.

In an embodiment, magnetic tape device 130 includes information repository 134. In an embodiment, information repository 134 may be managed by sHKDS recovery program 132. In an alternate embodiment, information repository 134 may be managed by the operating system of the device, alone, or together with, sHKDS recovery program 132. Information repository 134 is a data repository that can store, gather, compare, and/or combine information. In some embodiments, information repository 134 is located externally to magnetic tape device 130 and accessed through a communication network, such as network 120. In some embodiments, information repository 134 is stored on magnetic tape device 130. In some embodiments, information repository 134 may reside on another computing device (not shown), provided that information repository 134 is accessible by magnetic tape device 130. Information repository 134 includes, but is not limited to, sHKDS data, ERP data, HRTD data, configuration data, storage system configuration data, filesystem data, and other data that is received by sHKDS recovery program 132 from one or more sources, and data that is created by sHKDS recovery program 132.

Information repository 134 may be implemented using any volatile or non-volatile storage media for storing information, as known in the art. Similarly, information repository 134 may be implemented with any suitable storage architecture known in the art, such as a relational database, an object-oriented database, or one or more tables.

FIG. 2 is an example of the structure of a sub data set on a typical tape drive, in accordance with an embodiment of the present invention. In the example tape drive of FIG. 2, sub data set 200 is organized as 168 rows where each row contains 912 bytes of data. Sub data set 200 contains Sub Data Set Data 204, C1 Header 202, C1 Parity 206, and C2 Parity 208. In the example tape drive of FIG. 2, a collection of 64 sub data sets is called a data set. The tape drive writes data onto the tape medium in units of data sets.

When 168 rows, each containing 912 bytes of data, are written in the buffer, a 48-byte error correction code (ECC), C1 Parity 206, is added to each 12-byte C1 Header 202 and each 912 byte Sub Data Set Data row. When the C1 ECC for the full 168 rows is added, a 24-byte ECC, C2 Parity 208, is added to 168 bytes in each column in the vertical direction.

FIG. 3 is a simplified example of a cut and paste ERP, in accordance with an embodiment of the present invention. When reading the data written on the tape, the read operation may fail depending on the condition of the tape head and the degree of deterioration of the tape media. In that case, the tape is repeatedly rewound and reread until the data can be read correctly. This read process is called an ERP. Normally, if the tape is read again under the same conditions the tape is impossible to read, so ERP is repeated while changing various settings of the tape drive. By performing read ERPs while changing a variety of settings, the drive can read different C1 rows each ERP.

In the example of FIG. 3, each read attempt is successful at reading a subset of rows, but not all rows can be successfully read in any one attempt. Therefore, in addition to the area that was used for the read process, another area is reserved for storing the C1 rows that could be corrected by C1 at the time of each reading. In this example, Row 342 could not be recovered using C1 alone. Therefore, the ERP repeats until the number of C1 rows are recovered such that the error bytes in Row 342 can be corrected by the C2 bits. This mechanism called cut and paste ERP, and the area is reserved for storing the C1 rows that could be corrected by C1 at the time of each reading is called the cut and paste segment.

FIG. 3 includes three read attempts, $1^{st}$ Read Attempt 310, $2^{nd}$ Read Attempt 320, and $3^{rd}$ Read Attempt 330. $1^{st}$ Read Attempt 310 includes Good Row 312 and Good Row 314, both of which were corrected using the C1 ECC. These two good rows are copied into the corresponding location in Cut and Paste Segment 340, as indicated by Arrow 316 and Arrow 318, as they were in $1^{st}$ Read Attempt 310, i.e., the second and fourth rows in this example.

In $2^{nd}$ Read Attempt 320, by varying read parameters of the tape drive, Good Row 322, Good Row 312, and Good Row 324 are recovered. Since Good Row 312 was already recovered in $1^{st}$ Read Attempt 310, it does not have to be copied into Cut and Paste Segment 340. Therefore, Good Row 322 and Good Row 324 are copied into corresponding segments in Cut and Paste Segment 340 as shown by Arrow 326 and Arrow 328.

Finally, in $3^{rd}$ Read Attempt 330 Good Row 332 is recovered and copied into the corresponding segment in Cut and Paste Segment 340 as shown by Arrow 336. Row 342, however, fails and is corrected using C2 Bits 344 from the recovered C1 rows. In the example of FIG. 3, the entire data segment has now been recovered.

Figure 4:
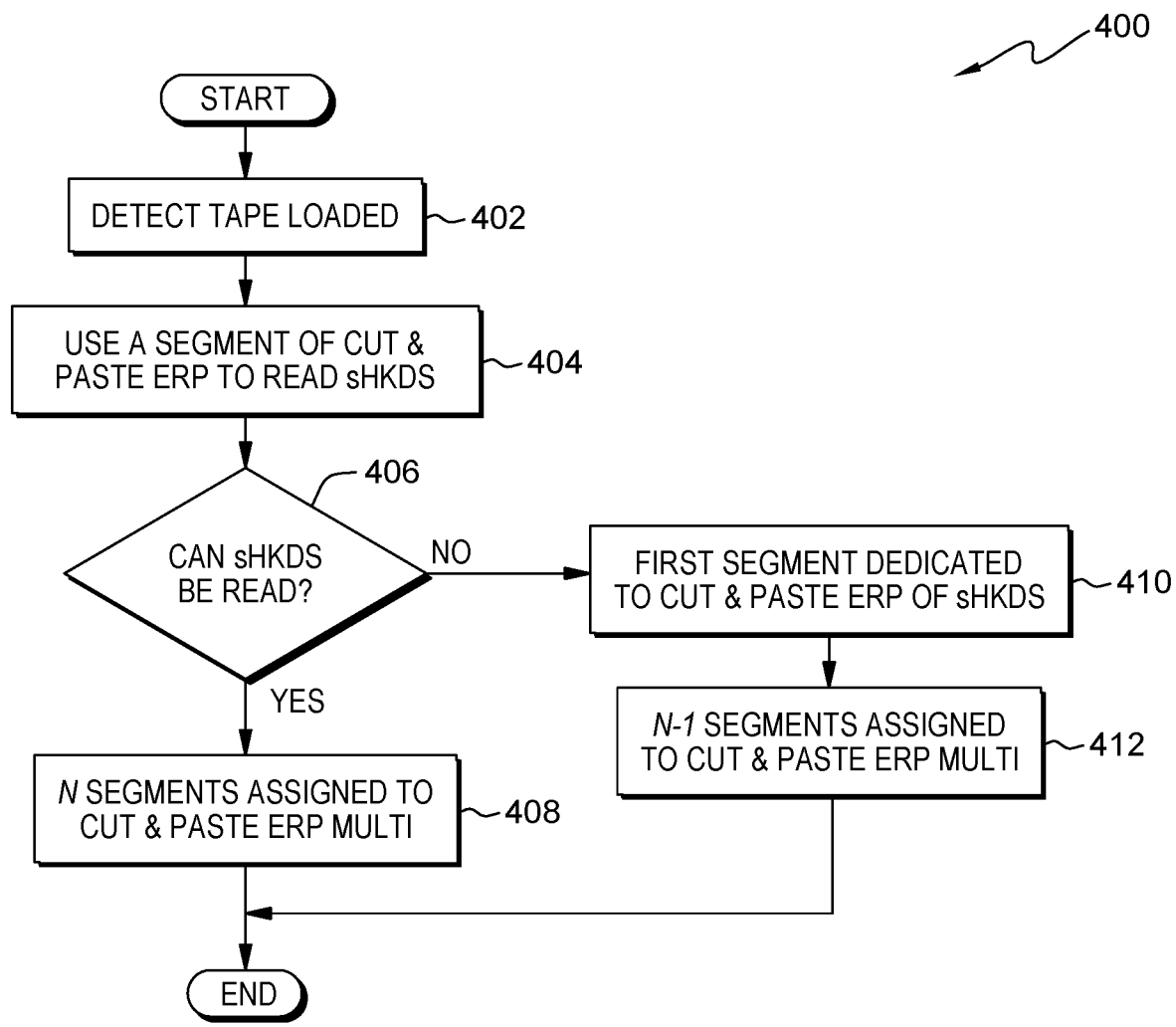
FIG. 4 is a flowchart depicting operational steps of the section of code for segment allocation during tape loading performed by sHKDS recovery program 132 for recovery of the HRTD using the cut and paste multi Error Recovery Procedure (ERP), on a magnetic tape device within the distributed data processing environment of FIG. 1, in accordance with an embodiment of the present invention.

FIG. 4 is a flowchart depicting operational steps of the section of code for segment allocation during tape loading performed by sHKDS recovery program 132 for recovery of the HRTD using the cut and paste multi ERP, on a magnetic tape device within the distributed data processing environment of FIG. 1, in accordance with an embodiment of the present invention. This section of code will run each time a tape is loaded into the tape drive. In an alternative embodiment, the steps of workflow 400 may be performed by any other program while working with sHKDS recovery program 132.

In an embodiment, the sHKDS which is read immediately after loading a tape consists of one data set. If the sHKDS cannot be read, the drive cannot use the HRTD to locate the target record position. In case the sHKDS cannot be read, the first segment out of N segments reserved for the cut and paste ERP for normal data sets is instead used for cut and paste ERP to attempt to recover the sHKDS. When loading a tape, however, to reduce the loading time ERP is only performed for a minimum number of attempts, e.g., two to three, when attempting to read the sHKDS. In an embodiment, when it is possible to acquire the HRTD by reading the sHKDS, all the N segments are used in subsequent cut and paste ERP for normal data sets.

The tape loading process will be completed successful even though the sHKDS cannot be read because the sHKDS is a housekeeping data set and not a user data set. Without reading a valid sHKDS, the drive can read or write data sets from the beginning of the tape. When the tape loading process is completed without successfully reading the sHKDS, however, sHKDS recovery program 132 will reserve the cut and paste segment which was used in attempting to read the sHKDS on loading, for cut and paste ERP to be used as the segment for reading sHKDS. This segment has been used for storing good C1 rows during the attempts at the loading process and therefore this segment may contain good C1 rows that should be utilized for the following sHKDS reads. The remaining 15 segments are used for cut and paste ERP in normal data set reading.

In an embodiment, sHKDS recovery program 132 detects that a tape has been loaded into the tape drive, and the tape drive is attempting to read the sHKDS. In an embodiment, sHKDS recovery program 132 reserves the first segment of the N segments allocated to cut and paste ERP of normal data sets to be used for cut and paste ERP of the sHKDS. In an embodiment, sHKDS recovery program 132 determines whether the sHKDS can be read normally. In an embodiment, if sHKDS recovery program 132 determines that the sHKDS can be read normally, then sHKDS recovery program 132 assigns all N segments for cut and paste ERP of the normal data sets. In an embodiment, sHKDS recovery program 132 then ends for this cycle. In an embodiment, sHKDS recovery program 132 assigns the segment which was used for cut and paste ERP of the sHKDS from one of the segments dedicated for cut and paste ERP of the normal data sets to the cut and paste ERP of the sHKDS. In an embodiment, sHKDS recovery program 132 assigns all N−1 remaining segments for cut and paste ERP of the normal data sets. In an embodiment, sHKDS recovery program 132 then ends for this cycle.

It should be appreciated that embodiments of the present invention provide at least for the section of code for segment allocation during tape loading performed by sHKDS recovery program 132 for recovery of the HRTD using the cut and paste multi Error Recovery Procedure (ERP). However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

sHKDS recovery program 132 detects a tape loaded (step 402). In an embodiment, sHKDS recovery program 132 detects that a tape has been loaded into the tape drive, and the tape drive is attempting to read the sHKDS.

sHKDS recovery program 132 uses a segment of the cut and paste ERP to read the sHKDS (step 404). In an embodiment, sHKDS recovery program 132 reserves the first segment of the N segments allocated to cut and paste ERP of normal data sets to be used for cut and paste ERP of the sHKDS. In one typical tape drive, N is 16 segments.

sHKDS recovery program 132 determines if the sHKDS can be read (decision block 406). In an embodiment, sHKDS recovery program 132 determines whether the sHKDS can be read normally. In an embodiment, if sHKDS recovery program 132 determines that the sHKDS can be read normally ("yes" branch, decision block 406), then sHKDS recovery program 132 proceeds to step 408 to assign segments for cut and paste ERP of the normal data sets. In an embodiment, if sHKDS recovery program 132 determines that the sHKDS cannot be read normally ("no" branch, decision block 406), then then sHKDS recovery program 132 proceeds to step 410 to assign segments for cut and paste of the sHKDS.

sHKDS recovery program 132 assigns N segments to the cut and paste ERP multi (step 408). In an embodiment, if sHKDS recovery program 132 determines that the sHKDS can be read normally, then sHKDS recovery program 132 assigns all N segments for cut and paste ERP of the normal data sets. In an embodiment, sHKDS recovery program 132 then ends for this cycle.

sHKDS recovery program 132 dedicates a segment to cut and paste ERP of sHKDS (step 410). In an embodiment, sHKDS recovery program 132 assigns the segment which was used for cut and paste ERP of the sHKDS from one of the segments dedicated for cut and paste ERP of the normal data sets to the cut and paste ERP of the sHKDS.

sHKDS recovery program 132 assigns N−1 segments to the cut and paste ERP multi (step 412). In an embodiment, sHKDS recovery program 132 assigns all N−1 remaining segments for cut and paste ERP of the normal data sets. In an embodiment, sHKDS recovery program 132 then ends for this cycle.

Figure 5:
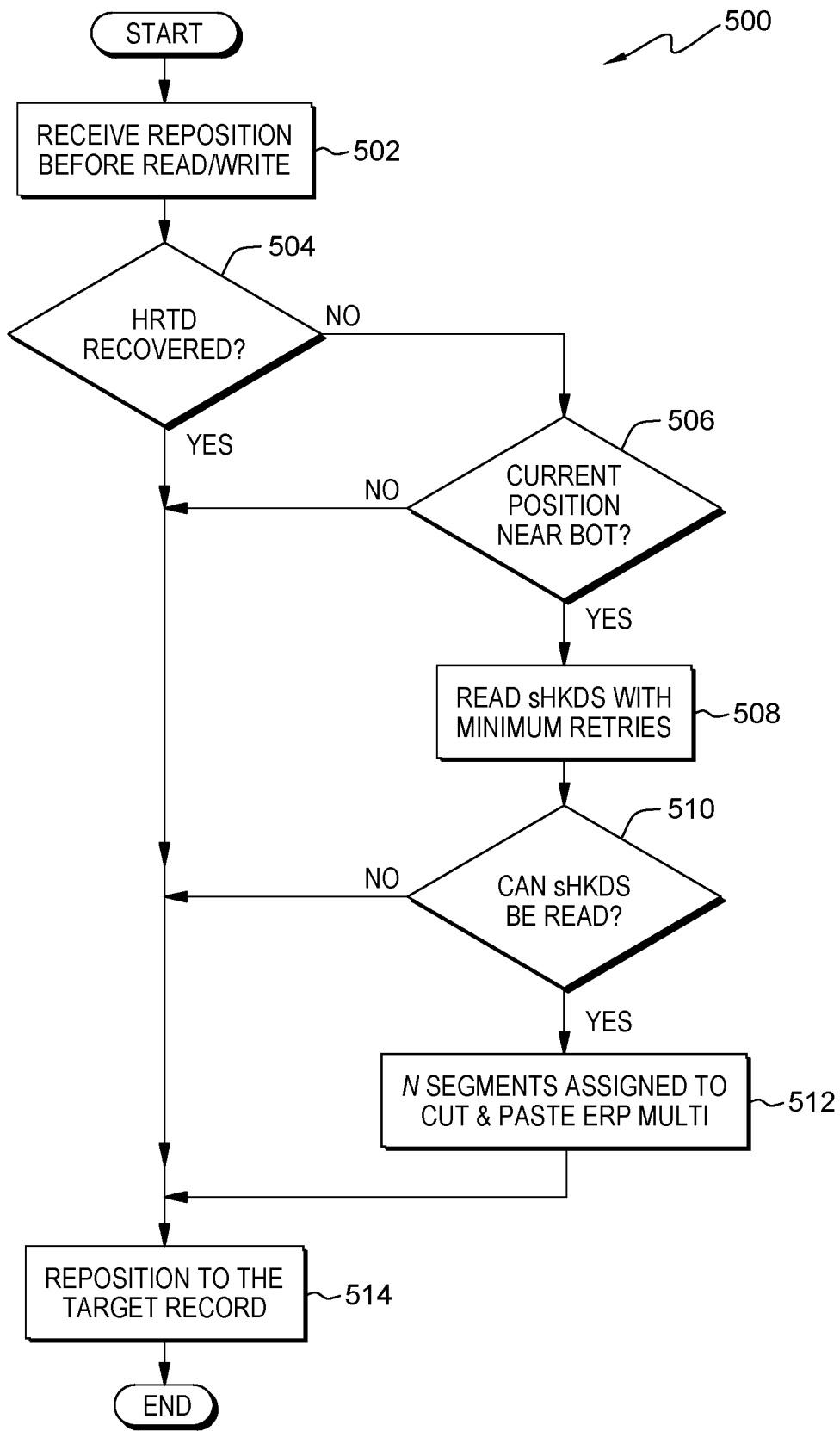
FIG. 5 is a flowchart depicting operational steps of the section of code for cut and paste segment alignment in normal read ERP performed by sHKDS recovery program 132 for recovery of the HRTD using the cut and paste multi ERP, on a magnetic tape device within the distributed data processing environment of FIG. 1, in accordance with an embodiment of the present invention.

FIG. 5 is a flowchart depicting operational steps of the section of code for cut and paste segment alignment in normal read ERP performed by sHKDS recovery program 132 for recovery of the HRTD using the cut and paste multi ERP, on a magnetic tape device within the distributed data processing environment of FIG. 1, in accordance with an embodiment of the present invention. This section of code will run each time a reposition operation is required in order to perform a read or write operation on the tape drive. In an alternative embodiment, the steps of workflow 500 may be performed by any other program while working with sHKDS recovery program 132.

In an embodiment, upon receipt of a request for reposition from a position near the Beginning Of Tape (BOT) to a target record position to read or write a record when the HRTD cannot be retrieved from sHKDS, the ERP for reading the sHKDS is restricted to a minimum number of times, e.g., two or three times, in an attempt to recover the HRTD. When the drive attempted to read sHKDS on loading a tape, the drive performs read ERPs 2 or 3 times. During these ERPs, the drive has already utilized the cut and paste ERP. So good C1 rows were copied to one of the cut and paste segments. The cut and paste segment for reading sHKDS on loading tape is reserved for the following sHKDS read attempts at reposition commands. Therefore, at this time, the C1 rows read here by the ERP are used to perform cut & paste ERP, in addition to C1 rows having been read in the past and stored in the segment reserved for cut & paste ERP to read sHKDS.

The sHKDS is written at the BOT, which is the beginning of physical location of the tape and not the beginning of user data. This means all the beginning of wraps (BOW) of even wraps are at the BOT, but they are not the beginning of the user data. The drive can recover the HRTD by reading the sHKDS if the current position is near the BOT.

For a typical tape, 128 HRTDs are generated for each partition. For this typical tape, if the tape is divided into two partitions, the sHKDS records 256 HRTDs. As described earlier, if a write command is issued at the beginning of the user data, it is not necessary to recover the HRTD if the tape has a single partition. But if the tape is divided into multiple partitions, it is worth recovering HRTDs of other partitions by reading sHKDS even when the write command is issued at the beginning of the user data on a partition.

In an embodiment, when the HRTD is recovered resulting from successfully reading the sHKDS, the first segment previously reserved for the cut and paste ERP to read the sHKDS is released, and all N segments are available for cut and paste ERP for the normal data sets.

In an embodiment, sHKDS recovery program 132 receives a notification that a reposition is required in order to perform a read or write operation on the tape drive. In an embodiment, sHKDS recovery program 132 determines whether the HRTD was recovered, e.g., when the tape was loaded or when a previous reposition command was issued. In an embodiment, sHKDS recovery program 132 determines whether either the current position or the target record position is near the BOT. In an embodiment, if sHKDS recovery program 132 determines that the current position of the target record position is near the BOT, then sHKDS recovery program 132 only performs cut and paste ERP to attempt to recover the sHKDS a minimum number of times, e.g., two or three times. In an embodiment, sHKDS recovery program 132 determines whether the sHKDS was successfully recovered. In an embodiment, if sHKDS recovery program 132 determines that the sHKDS was successfully recovered, then sHKDS recovery program 132 restores the segment that was dedicated to the cut and paste ERP of the sHKDS back to the cut and paste ERP of the normal data sets. In an embodiment, sHKDS recovery program 132 uses the sHKDS to reposition to the target record if the sHKDS was recovered. In an embodiment, sHKDS recovery program 112 uses the tape directory to reposition to the target record if the sHKDS was not recovered. In an embodiment, sHKDS recovery program 132 then ends for this cycle.

It should be appreciated that embodiments of the present invention provide at least for the section of code for cut and paste segment alignment in normal read ERP of sHKDS recovery program 132 for using a cut and paste segment for reading an sHKDS. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

sHKDS recovery program 132 receives a reposition before read/write (step 502). In an embodiment, sHKDS recovery program 132 receives a notification that a reposition is required in order to perform a read operation or a write operation on the tape drive.

sHKDS recovery program 132 determines if the HRTD was recovered (decision block 504). In an embodiment, sHKDS recovery program 132 determines whether the HRTD was recovered, e.g., when the tape was loaded or when a previous reposition command was issued. In an embodiment, this determination was made in FIG. 4 above. In an embodiment, if sHKDS recovery program 132 determines that the HRTD was recovered ("yes" branch, decision block 504), then sHKDS recovery program 132 proceeds to step 514 to reposition the tape to the target record. In an embodiment, if sHKDS recovery program 132 determines that the HRTD was not recovered ("no" branch, decision block 504), then sHKDS recovery program 132 proceeds to decision block 506.

sHKDS recovery program 132 determines whether the current position is near the BOT (decision block 506). In an embodiment, sHKDS recovery program 132 determines whether either the current position or the target record position is near the BOT. Since it takes a long time to navigate to the sHKDS when the current position is not near the BOT, sHKDS recovery program 132 tries to reposition to the target without the HRTD if the target record position is not near the BOT. Since in this case the sHKDS read failed upon loading the tape, the attempt to read the sHKDS may waste time. But if the current position is near the BOT, the drive can move to the BOT to read the sHKDS quickly, and therefore the time to attempt to read the sHKDS may be acceptable.

In an embodiment, if sHKDS recovery program 132 determines that either the current position or the target record position is near the BOT ("yes" branch, decision block 506), then sHKDS recovery program 132 proceeds to step 508 to attempt to read the sHKDS. In an embodiment, if sHKDS recovery program 132 determines that neither the current position nor the target record position is near the BOT ("no" branch, decision block 506), then sHKDS recovery program 132 proceeds to step 514 to reposition the tape to the target record.

sHKDS recovery program 132 reads the sHKDS with minimum retries (step 508). In an embodiment, if sHKDS recovery program 132 determines that the current position of the target record position is near the BOT, then sHKDS recovery program 132 only performs cut and paste ERP to attempt to recover the sHKDS a minimum number of times, e.g., two or three times. If current position is near the BOT, however, the drive can move to the BOT to read the sHKDS without delay. Therefore, sHKDS recovery program 132 only performs a minimum number cut and paste ERP attempts. In an embodiment, sHKDS recovery program 132 uses C1 rows read here in addition to C1 rows that have been read in the past and stored in the segment reserved for cut and paste ERP to perform cut and paste ERP to read sHKDS.

sHKDS recovery program 132 determines whether the sHKDS can be read (decision block 510). In an embodiment, sHKDS recovery program 132 determines whether the sHKDS was successfully recovered in step 508. In an embodiment, if sHKDS recovery program 132 determines that the sHKDS was successfully recovered ("yes" branch, decision block 510), then sHKDS recovery program 132 proceeds to step 512 to reassign segments. In an embodiment, if sHKDS recovery program 132 determines that the sHKDS was not successfully recovered ("no" branch, decision block 510), then sHKDS recovery program 132 proceeds to step 514 to reposition the tape to the target record.

sHKDS recovery program 132 assigns N segments to the cut and paste ERP multi (step 512). In an embodiment, if sHKDS recovery program 132 determines that the sHKDS was successfully recovered, then sHKDS recovery program 132 restores the segment that was dedicated to the cut and paste ERP of the sHKDS back to the cut and paste ERP of the normal data sets. In an embodiment, sHKDS recovery program 132 then proceeds to step 514 to reposition to the target record.

sHKDS recovery program 132 repositions to the target record (step 514). In an embodiment, sHKDS recovery program 132 uses the sHKDS to reposition to the target record if the sHKDS was recovered. In an embodiment, sHKDS recovery program 112 uses the tape directory to reposition to the target record if the sHKDS was not recovered. In an embodiment, sHKDS recovery program 132 then ends for this cycle.

Figure 6:
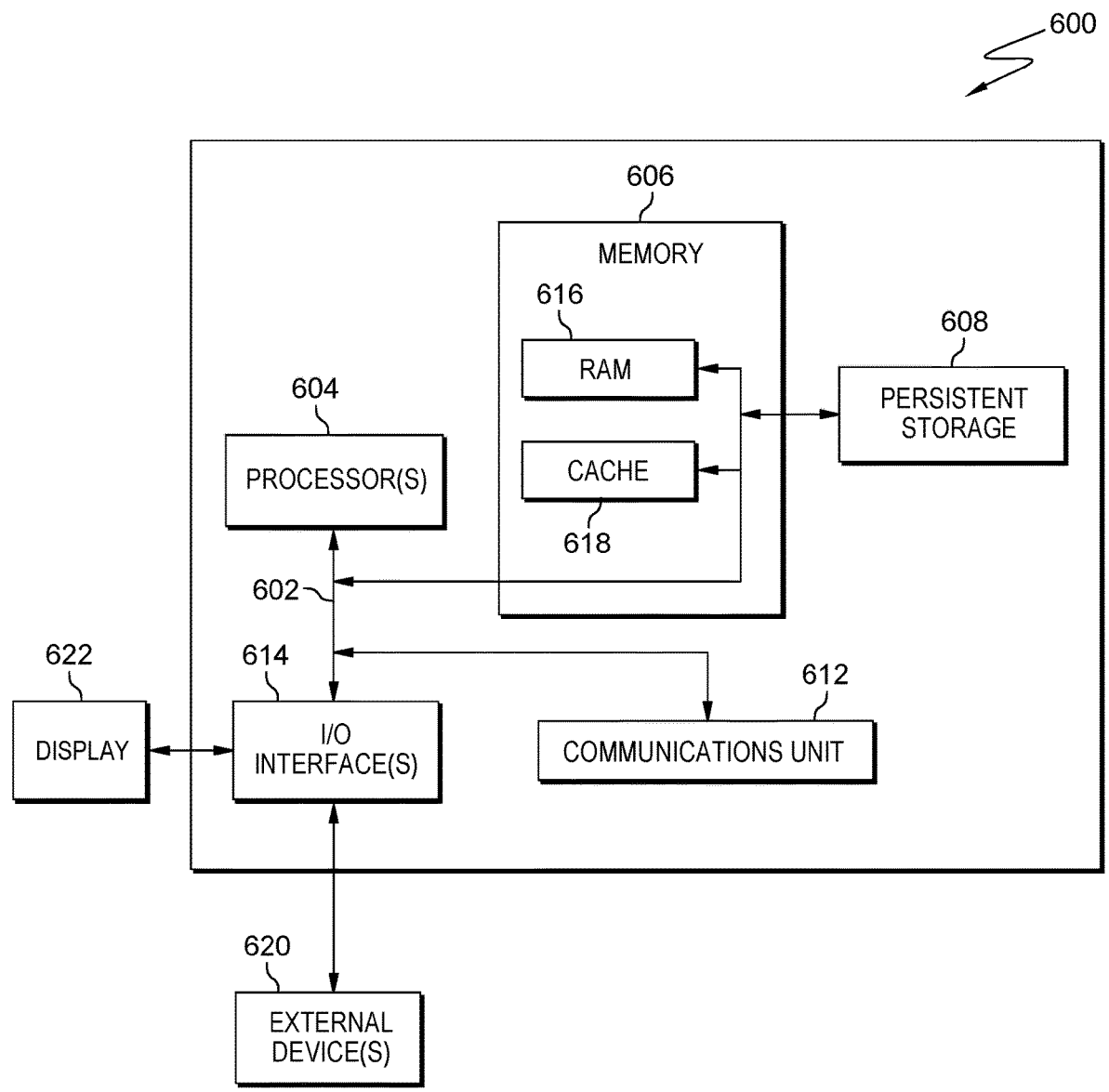
FIG. 6 depicts a block diagram of components of the magnetic tape device executing the sHKDS recovery program within the distributed data processing environment of FIG. 1, in accordance with an embodiment of the present invention.

FIG. 6 is a block diagram depicting components of computing device 110 suitable for sHKDS recovery program 132, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for sHKDS recovery program 132 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., sHKDS recovery program 132, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for using a cut and paste segment for reading a standard Housekeeping Data Set (sHKDS), the computer-implemented method comprising:
    receiving, by one or more computer processors, a request to reposition a tape media in a tape drive;
    responsive to encountering an error reading an sHKDS while attempting to reposition the tape media, using, by the one or more computer processors, one segment of a plurality of segments from a data set cut and paste error recovery procedure (ERP) for an sHKDS cut and paste ERP; and
    responsive to recovering the sHKDS using the sHKDS cut and paste ERP, releasing, by the one or more computer processors, the one segment reserved for the sHKDS cut and paste ERP to the data set cut and paste ERP.

2. The computer-implemented method of claim 1, wherein responsive to encountering the error reading the sHKDS, using the one segment of the plurality of segments from the data set cut and paste ERP for the sHKDS cut and paste ERP comprises:

restricting, by the one or more computer processors, a number of attempts to recover the sHKDS using the sHKDS cut and paste ERP to a minimum number of attempts;

responsive to recovering the sHKDS using the sHKDS cut and paste ERP within the minimum number of attempts, releasing, by the one or more computer processors, the one segment reserved for the sHKDS cut and paste ERP to the data set cut and paste ERP; and responsive to failing to recover the sHKDS using the sHKDS cut and paste ERP within the minimum number of attempts, executing, by the one or more computer processors, repositioning of the tape media without the sHKDS.

3. The computer-implemented method of claim 2, wherein restricting the number of attempts to recover the sHKDS using the sHKDS cut and paste ERP to the minimum number of attempts further comprises:

responsive to encountering the error reading the sHKDS upon receipt of the request to reposition the tape media, wherein the request to reposition the tape media is from a position near a beginning of the tape media to a target record position, restricting, by the one or more computer processors, the number of attempts to recover the sHKDS using the sHKDS cut and paste ERP to the minimum number.

4. The computer-implemented method of claim 2, wherein restricting the number of attempts to recover the sHKDS using the cut and paste ERP of the sHKDS to the minimum number further comprises:

responsive to encountering the error reading the sHKDS upon receipt of the request to reposition the tape media, wherein the request to reposition the tape media is to a target position near a beginning of the tape media, restricting, by the one or more computer processors, the number of attempts to recover the sHKDS using the sHKDS cut and paste ERP to the minimum number.

5. The computer-implemented method of claim 2, wherein the minimum number is not greater than 3.

6. The computer-implemented method of claim 1, wherein the sHKDS is stored in a housekeeping area of the tape media and is read first when the tape media is loaded into the tape drive.

7. The computer-implemented method of claim 1, wherein the plurality of segments from the data set cut and paste ERP is 16 segments.

8. A computer program product for using a cut and paste segment for reading a standard Housekeeping Data Set (sHKDS), the computer program product comprising one or more computer readable storage media and program instructions stored on the one or more computer readable storage media, the program instructions including instructions to:

receive a request to reposition a tape media in a tape drive;

responsive to encountering an error reading an sHKDS while attempting to reposition the tape media, use one segment of a plurality of segments from a data set cut and paste error recovery procedure (ERP) for an sHKDS cut and paste ERP; and responsive to recovering the sHKDS using the sHKDS cut and paste ERP, release the one segment reserved for the sHKDS cut and paste ERP to the data set cut and paste ERP.

9. The computer program product of claim 8, wherein responsive to encountering the error reading the sHKDS while attempting to reposition the tape media, use the one segment of the plurality of segments from the data set cut and paste error recovery procedure (ERP) for the sHKDS cut and paste ERP further comprises one or more of the following program instructions, stored on the one or more computer readable storage media, to:

restrict a number of attempts to recover the sHKDS using the sHKDS cut and paste ERP to a minimum number of attempts;

responsive to recovering the sHKDS using the sHKDS cut and paste ERP within the minimum number of attempts, release the one segment reserved for the sHKDS cut and paste ERP to the data set cut and paste ERP; and responsive to failing to recover the sHKDS using the sHKDS cut and paste ERP within the minimum number of attempts, execute repositioning of the tape media without the sHKDS.

10. The computer program product of claim 9, wherein restrict the number of attempts to recover the sHKDS using the sHKDS cut and paste ERP to the minimum number of attempts further comprises one or more of the following program instructions, stored on the one or more computer readable storage media, to:

responsive to encountering the error reading the sHKDS upon receipt of the request to reposition the tape media, wherein the request to reposition the tape media is from a position near a beginning of the tape media to a target record position, restrict the number of attempts to recover the sHKDS using the sHKDS cut and paste ERP to the minimum number.

11. The computer program product of claim 9, wherein restrict the number of attempts to recover the sHKDS using the sHKDS cut and paste ERP to the minimum number of attempts further comprises one or more of the following program instructions, stored on the one or more computer readable storage media, to:

responsive to encountering the error reading the sHKDS upon receipt of the request to reposition the tape media, wherein the request to reposition the tape media is to a target position near a beginning of the tape media, restricting, by the one or more computer processors, the number of attempts to recover the sHKDS using the sHKDS cut and paste ERP to the minimum number.

12. The computer program product of claim 9, wherein the minimum number is not greater than 3.

13. The computer program product of claim 8, wherein the sHKDS is stored in a housekeeping area of the tape media and is read first when the tape media is loaded into the tape drive.

14. The computer program product of claim 8, wherein the plurality of segments from the data set cut and paste ERP is 16 segments.

15. A computer system for using a cut and paste segment for reading a standard Housekeeping Data Set (sHKDS), the computer system comprising:

one or more computer processors;

one or more computer readable storage media; and program instructions stored on the one or more computer readable storage media for execution by at least one of the one or more computer processors, the stored program instructions including instructions to:

receive a request to reposition a tape media in a tape drive;

responsive to encountering an error reading an sHKDS while attempting to reposition the tape media, use one segment of a plurality of segments from a data set cut and paste error recovery procedure (ERP) for an sHKDS cut and paste ERP; and responsive to recovering the sHKDS using the sHKDS cut and paste ERP, release the one segment reserved for the sHKDS cut and paste ERP to the data set cut and paste ERP.

16. The computer system of claim 15, wherein responsive to encountering the error reading the sHKDS while attempting to reposition the tape media, use the one segment of the plurality of segments from the data set cut and paste error recovery procedure (ERP) for the sHKDS cut and paste ERP further comprises one or more of the following program instructions, stored on the one or more computer readable storage media, to:

restrict a number of attempts to recover the sHKDS using the sHKDS cut and paste ERP to a minimum number of attempts;

responsive to recovering the sHKDS using the sHKDS cut and paste ERP within the minimum number of attempts, release the one segment reserved for the sHKDS cut and paste ERP to the data set cut and paste ERP; and responsive to failing to recover the sHKDS using the sHKDS cut and paste ERP within the minimum number of attempts, execute repositioning of the tape media without the sHKDS.

17. The computer system of claim 16, wherein restrict the number of attempts to recover the sHKDS using the sHKDS cut and paste ERP to the minimum number of attempts further comprises one or more of the following program instructions, stored on the one or more computer readable storage media, to:

responsive to encountering the error reading the sHKDS upon receipt of the request to reposition the tape media, wherein the request to reposition the tape media is from a position near a beginning of the tape media to a target record position, restrict the number of attempts to recover the sHKDS using the sHKDS cut and paste ERP to the minimum number.

18. The computer system of claim 16, wherein restrict the number of attempts to recover the sHKDS using the sHKDS cut and paste ERP to the minimum number of attempts further comprises one or more of the following program instructions, stored on the one or more computer readable storage media, to:

responsive to encountering the error reading the sHKDS upon receipt of the request to reposition the tape media, wherein the request to reposition the tape media is to a target position near a beginning of the tape media, restricting, by the one or more computer processors, the number of attempts to recover the sHKDS using the sHKDS cut and paste ERP to the minimum number.

19. The computer system of claim 16, wherein the minimum number is not greater than 3.

20. The computer system of claim 15, wherein the sHKDS is stored in a housekeeping area of the tape media and is read first when the tape media is loaded into the tape drive.

* * * * *